April 1, 1952     E. H. LOHSE     2,591,171
BRAKE OPERATED BY STEERING MEANS
Filed Aug. 10, 1948
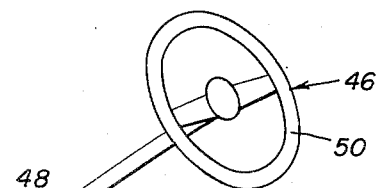
Fig. 1.
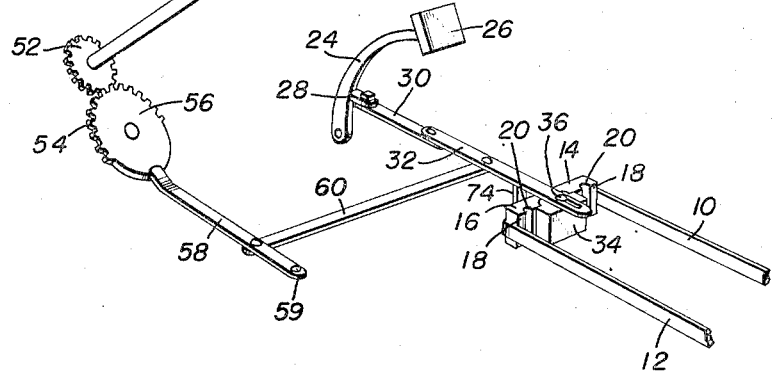
Fig. 2.     Fig. 3.     Fig. 4.
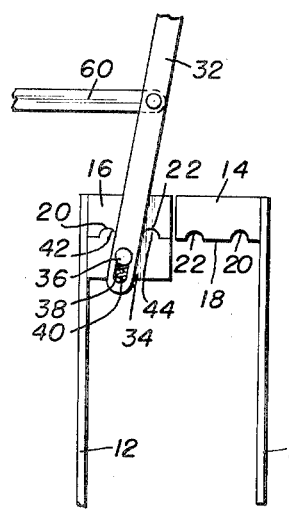 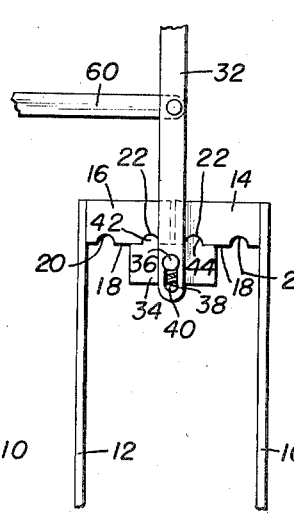 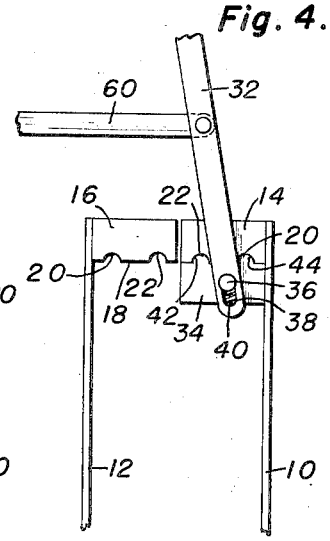
Fig. 5.
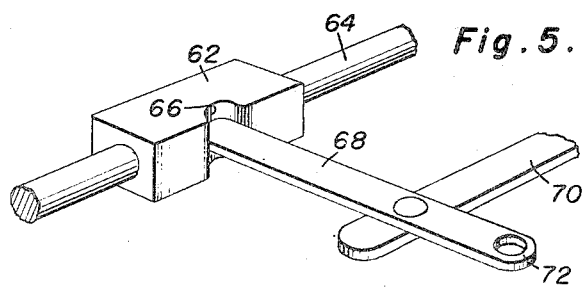
Elmer H. Lohse
INVENTOR.
BY *Clarence A. O'Brien*
*and Harvey B. Jacobson*
Attorneys Patented Apr. 1, 1952

2,591,171

UNITED STATES PATENT OFFICE 2,591,171

BRAKE OPERATED BY STEERING MEANS

Elmer H. Lohse, East Moline, Ill.

Application August 10, 1948, Serial No. 43,383

8 Claims. (Cl. 180—6.36)

This invention relates to new and useful improvements in brake mechanisms for vehicles, and the primary object of the present invention is to provide a brake selector for tractors, combines and the like which can be employed for braking the said vehicle as the same is turned for guiding movement.

Another important object of the present invention is to provide a brake selector for tractors, combines and the like including a novel and improved selector mechanism which can be employed for simultaneously actuating the pair of brake operating rods or which may be employed for actuating a selector of the brake actuating rods.

A further object of the present invention is to provide a novel and improved brake selector or brake mechanism for tractors, combines and the like that is extremely small and compact in structure, and which is quickly and readily applied to or removed from the conventional platform structure of a tractor without the necessity of having to remove or harmfully affect any portion of a tractor on which the same is applied.

A still further aim of the present invention is to provide a brake mechanism of the aforementioned character that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view showing the present invention applied to the brake operating rods of a tractor;

Figure 2 is a top plan view showing the present invention applied to one operating rod of a tractor, and with parts thereof broken away;

Figure 3 is a fragmentary top plan view showing the present invention operatively engaged with both brake operating rods of a tractor;

Figure 4 is a fragmentary top plan view showing the present invention engaged with one of the brake operating rods of a tractor; and, Figure 5 is a fragmentary perspective view showing the selector means used in conjunction with the present invention, in slightly modified form.

Referring now to the drawings in detail, wherein for the purpose of illustration, there is disclosed a preferred embodiment of the present invention, the numerals 10 and 12 represent the pair of spaced parallel brake operating or actuating rods of a vehicle, such as a tractor, combine or the like which heretofore have been operated by a pair of foot pedals that are usually located on one side of an operator's platform away from the clutch pedal (not shown). With the above referred to conventional structure, it has been necessary for an operator to employ both feet for equalizing the pressure applied to the brake rods and to remove his foot from the clutch pedal in order to actuate both of the said brake operating rods.

Therefore, it is the principal feature of this invention to provide a single foot-operated pedal that can be employed for independent or collective actuation of said brake rods 10 and 12.

To accomplish the above desired results, there is provided a pair of spaced actuated members or substantially rectangular blocks 14 and 16 which are secured by any suitable means to the inner faces of the brake operating rods 10 and 12. These blocks 14 and 16 each include rear vertical faces 18 that are provided with space parallel, substantially vertical recesses or grooves 20 and 22.

Pivotally secured by any suitable means to a portion of the tractor or combine floorboard (not shown), is the lever portion 24 of the pressure plate or foot pedal 26.

An ear or lug 28 integrally formed with or rigidly attached to the lever portion 24, is removably secured to a rearwardly extending link or pitman 30 the rear terminal of which is pivoted to the forward terminal of a further link or bar 32.

Projecting outwardly from a substantially rectangular actuator block 34, is a headed pin 36 that slidably engages a slot 38 provided in the rear terminal of the link 32, and a coil spring 40 is mounted in the slot and acts upon the pin 36 to normally urge the block or actuator 34 forwardly towards the blocks 14 and 16.

A pair of spaced parallel, substantially vertical ribs or tongues 42 and 44 are provided on the forward face of the block 34 and are adapted to engage the recesses 20 and 22 of either block 14 and 16, or the recesses 22 of both blocks 14 and 16 in a manner which will presently be described.

In order to engage the ribs 42 and 44 with selective of the recesses 20 and 22, there is provided a selector mechanism that is designated generally by the numeral 46 and which is illustrated best in Figure 4 of the drawings. This selector includes a rotatable shaft 48 (the normal steering shaft of a tractor or combine) that is mounted in a conventional or suitable manner to the operator's platform of the tractor, combine or the like on which the present invention is applied.

A hand wheel or lever 50 is carried by the upper end of the shaft 48 and an annular gear 52 is mounted on the rear terminal of the shaft 48, and engages the arcuately disposed teeth 54 of an annular plate 56 which is rotatably secured to the undersurface of a floorboard (not shown) of a tractor or the like.

An arm 58 projects from the plate 56 and is pivoted adjacent its free rear terminal 59 to a cross link or pitman 60 that is pivoted to link 32, intermediate the ends thereof. The rear terminal 59 of the arm 58 is pivoted to a portion of the vehicle or floorboard thereof, so that by turning the shaft 48 to steer the said vehicle, the ribs 42 and 44 may be engaged with either of the blocks 14 and 16 or with both blocks 14 and 16. It being understood, that suitable resilient means (not shown) will act upon the lever 24 to retain the same raised and rearwardly so as to permit the block 34 to be operated by the links 60 and 32.

When the pedal 26 is depressed by an operator, the rods 10 and 12, independently or collectively, will be pulled forwardly to guide or brake the vehicle on which the present invention is applied.

As illustrated in Figure 2 of the drawings, the steering shaft 48 has been turned to guide the vehicle in a left turn, and the block 34 is engaged with the block 16 to brake the left side of the vehicle.

Figure 3 illustrates the block 34 engaged with both blocks 14 and 16 whereby the vehicle may be braked equally or more particularly both rear wheels of the vehicle will be actuated into a braked position when the foot pedal 26 is depressed.

Figure 4 illustrates the block 34 engaged with the block 14 whereby the steering shaft 48 is turned in a counterclockwise direction for turning the vehicle in a right direction whereby pressure upon the pedal 26 will brake the right wheel of the tractor.

Reference is now directed to Figure 5 wherein there is disclosed the selector means of slightly modified form. In this embodiment, a block 62 is mounted on a tie rod 64 (of the tractor or combine) and will move therewith as the vehicle on which the present invention is mounted is turned for guiding thereof. The block 62 includes a substantially vertical groove 66 that receives one end of a link 68. The link 68 is pivoted to a further link or pitman 70, which corresponds to link 60 as previously described. The link 68 is pivoted at its rear terminal 72 to a portion of the vehicle as previously described for the arm 58.

This latest modified selector mechanism will function similarly to that previously described, so as the tractor or combine is turned the tie rod 64 will move transversely to actuate the links 68 and 70 and position the block 34 engaged with a selected or both of the blocks 14 and 16.

In order to support the block 34 relative to the operating rods 10 and 12, there is provided a substantially L-shaped arm 74 which is rigidly secured to the link 32, as shown best in Figure 1 of the drawings. The block 34 is provided with a downwardly extending pin similar to that illustrated by the numeral 36 which engages a suitable slot provided in the free arm of the member 74 so that the said block 34 will not twist from a vertical position during movement thereof.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vehicle having a pair of brake operating rods and a steering mechanism; an actuated member fixed to each of said rods, said actuated members having recesses, an actuator member having ribs for selectively engaging the recesses in said actuated members, selector means activated by the steering mechanism for engaging said actuator with a selected one or with both of said actuated members for independent or collective actuation of said rods, means for operating said actuator, and means for yieldingly retaining the ribs in said recesses.

2. In a vehicle having a pair of brake operating rods and a steering mechanism; an actuated member fixed to each of said rods, said actuated members having recesses, an actuator member having ribs for selectively engaging the recesses in said actuated members, selector means operated by said steering mechanism for engaging said actuator with a selected one or with both of said actuated members for independent or collective actuation of said rods, a foot activated operating member connected to said actuator, and means yieldingly retaining the ribs of said actuator members in said recesses.

3. In a vehicle having a pair of brake operating rods and a steering mechanism; a brake selector comprising, a pair of spaced blocks fixed to said rods, said blocks having rear substantially vertical faces, a pair of spaced recesses provided in the rear faces of each of said blocks, an actuator member having a forward face, a pair of spaced ribs carried by the forward face of said actuator member, selector means activated during operation of said steering mechanism for engaging said ribs with selective of the recesses in said blocks for independent or collective activation of said rods, means yieldingly retaining said actuator engaged with one or both of said blocks, and means for operating said actuator.

4. In a vehicle having a plurality of brake activating rods and a steering mechanism including a shaft; a pair of activated members fixed to said rods and spaced from each other, an actuator, selector means for engaging said actuator with said activated members, said selector means including a swingable member, a link pivotally connected to said actuator and said swingable member and means operated by said steering mechanism shaft for swinging said swingable member, operating means for said actuator including a member slidably supporting the actuator, and means yieldingly urging the actuator toward said activated members.

5. In a vehicle having a plurality of brake actuating rods and a steering mechanism including a shaft; an activated member fixed to each of said rods, an actuator disposed behind the members, selector means for engaging said actuator with said activated member, said selector means including a swingable member, a first link having first and second ends, the first end of said first link being pivoted to said swingable member and means operated by said steering mechanism shaft for swinging said swinging member, and operating means for said actuator, said operating means including a further link slidably secured to said actuator and pivoted intermediate its ends to the second end of said first link, a foot operated member secured to said further link, said further link extending over the activated members, and spring means urging said actuator toward said activated members.

6. The combination of claim 5 wherein said means operated by said steering mechanism shaft include a holding member mounted on said shaft and having a recess therein, said swingable member having an end portion received in said recess.

7. In a vehicle having a pair of brake actuating rods and a steering mechanism; a pair of actuated members secured to said rods and spaced from each other, a link having a rear end extending over and beyond said members, an actuator slidably carried by the rear end of said link and disposed behind said members, a selector operated by the steering mechanism for engaging the actuator with a selected one or both of the members, and spring means urging the actuator forwardly on the link and toward said members.

8. In a vehicle having a pair of brake actuating rods and a steering mechanism; a pair of actuated members secured to said rods and spaced from each other, a slidable member having a rear end extending over and past the actuated members, an actuator slidably and pivotally secured to the rear end of said slidable member and disposed behind the actuated members, spring means acting on the actuator and urging the latter toward the actuated members, and means connected to said slidable member for engaging the actuator with a selected one or both of said actuated members.

ELMER H. LOHSE.

REFERENCES CITED

The following references are of record in the file of this patent:

UNITED STATES PATENTS

| Number | Name | Date |
| --- | --- | --- |
| 1,224,826 | Wiser | May 1, 1917 |
| 1,389,717 | Von Babo | Sept. 6, 1921 |
| 1,593,949 | Piche | July 27, 1926 |
| 1,625,151 | Piche | Apr. 19, 1927 |
| 1,632,665 | Mitchell | June 14, 1927 |
| 1,821,719 | Messier | Sept. 1, 1931 |
| 2,362,521 | Acton | Nov. 14, 1944 |
| 2,418,048 | Perrett | Mar. 25, 1947 |
| 2,419,908 | Mott | Apr. 29, 1947 |

FOREIGN PATENTS

| Number | Country | Date |
| --- | --- | --- |
| 322,269 | Great Britain | Dec. 5, 1929 |